United States Patent
Wong

(10) Patent No.: US 9,900,396 B2
(45) Date of Patent: Feb. 20, 2018

(54) PREDICTIVE CONTENT CACHING

(71) Applicant: Comcast Cable Communications, LLC, Philadelphia, PA (US)

(72) Inventor: Warren Wong, Concord, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 214 days.

(21) Appl. No.: 13/767,527

(22) Filed: Feb. 14, 2013

(65) Prior Publication Data

US 2014/0229609 A1 Aug. 14, 2014

(51) Int. Cl.
*G06F 15/173* (2006.01)
*H04L 29/08* (2006.01)

(52) U.S. Cl.
CPC .............. *H04L 67/2842* (2013.01)

(58) Field of Classification Search
CPC . H04L 67/2842; G06F 12/08; G06F 12/0866; G06F 17/30902; H04N 21/47217; H04N 21/2387; H04N 21/4325; H04N 21/44016
USPC .................. 709/203–204, 223–226
See application file for complete search history.

(56) References Cited

U.S. PATENT DOCUMENTS

| | | | | |
|---|---|---|---|---|
| 6,567,086 B1 * | 5/2003 | Hashimoto | ...... | H04N 21/21805 345/427 |
| 6,943,828 B1 * | 9/2005 | Grimes | ...... | H04N 5/10 348/194 |
| 7,548,948 B2 * | 6/2009 | Klemets et al. | ...... | 709/203 |
| 7,957,691 B1 * | 6/2011 | Lee | ...... | H04L 67/306 455/3.01 |
| 8,059,534 B2 * | 11/2011 | Kim et al. | ...... | 370/230 |
| 8,666,042 B2 * | 3/2014 | Wu et al. | ...... | 379/93.21 |
| 2002/0091722 A1 * | 7/2002 | Gupta et al. | ...... | 707/204 |
| 2002/0124132 A1 * | 9/2002 | Haines et al. | ...... | 711/112 |
| 2004/0010585 A1 * | 1/2004 | Jones et al. | ...... | 709/224 |
| 2007/0263720 A1 * | 11/2007 | He | ...... | H04N 19/124 375/240.03 |
| 2011/0083061 A1 * | 4/2011 | Grube et al. | ...... | 714/776 |
| 2011/0122939 A1 * | 5/2011 | Ganesan | ...... | H04N 19/115 375/240.01 |
| 2011/0299829 A1 * | 12/2011 | Tani | ...... | G11B 27/105 386/241 |
| 2012/0117261 A1 * | 5/2012 | Bouazizi | ...... | H04L 65/1069 709/231 |
| 2013/0185475 A1 * | 7/2013 | Talagala | ...... | G06F 12/0866 711/102 |
| 2013/0185508 A1 * | 7/2013 | Talagala | ...... | G06F 12/0888 711/118 |

* cited by examiner

*Primary Examiner* — Umar Cheema
*Assistant Examiner* — Anh Nguyen
(74) *Attorney, Agent, or Firm* — Banner & Witcoff, Ltd.

(57) ABSTRACT

Systems, methods, apparatuses, and computer readable media may be configured for improved predictive content caching. A system may determine a value that is a function of one or more rates at which a portion of a content item is being consumed and based on this value, may also calculate a projected position after a predetermined time period. By comparing the projected position to a dynamically adjustable threshold position for requesting a new portion of the content item, a determination may be made as to when to retrieve and/or cache a new portion of the content item.

18 Claims, 4 Drawing Sheets

PREDICTIVE CONTENT CACHING

BACKGROUND

User devices connected to content delivery networks allow end users to consume content. Because such devices have limited storage capabilities, only a portion of a content item being consumed may be cached locally at any given time.

As users navigate past a predefined position within a portion of the content item, a device may retrieve the next portion of the content item and, once retrieved, may locally cache this new portion of content. For example, when a user navigates beyond a predefined channel number within a portion of an electronic program guide that has been locally cached, the device may retrieve and locally cache a subsequent set of channel listings in anticipation of a user accessing and navigating this new content portion (e.g., segment). Because the device may cache the subsequent set of channel listings by overwriting the previously stored set, users may navigate subsequent channel listings without the device having to store the entire electronic program guide in local memory.

However, this and other conventional implementations pose various problems. For instance, if a user navigates to the end of a first portion of a content item before the next portion has been retrieved and cached, the user experience may be delayed until the device retrieves the next portion of the content item. Alternatively, if the user does not navigate to the end of the first portion of a content item that has already been cached, then network bandwidth and device memory may be wasted if, for example, the device prematurely retrieves the next portion of the content item.

Accordingly, there remains a need to improve the efficiency during content access or delivery.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

In some embodiments, disclosed systems, methods, and apparatuses are used to determine a dynamic threshold that determines when additional portions of a content item may or should be retrieved. The retrieval process may be based on a prediction of how quickly a user or associated device is consuming a given portion of a content item.

In some aspects, a prediction algorithm may be implemented to track a user's consumption (e.g., navigation) through a portion of a content item and to calculate a projected position for triggering retrieval of an additional portion of the content item.

This summary is not intended to identify critical or essential features of the disclosure herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
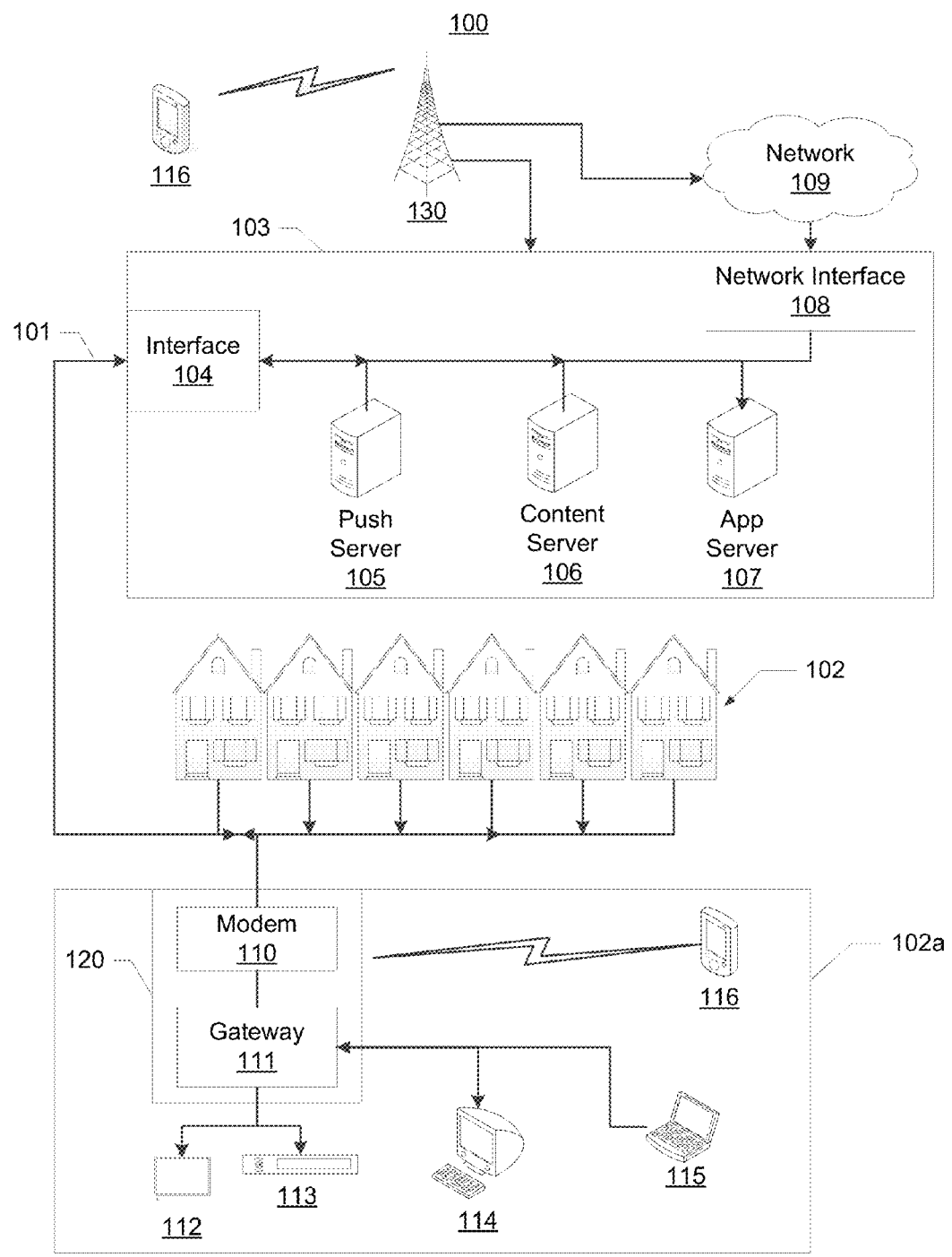
FIG. 1 illustrates an example network environment in accordance with example embodiments.

FIG. 1 illustrates an example information distribution network 100 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102a). In another example, the network 100 may be a fiber-optic system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into portions, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations. Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may also include one or more application servers 107.

Homes 102 such as home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway 111 may include local network interfaces to provide communication signals to devices in or near example home 102a, such as television 112, set-top box 113, personal computer 114, laptop computer 115, wireless device 116 (e.g., a wireless laptop, a tablet computer, a mobile phone, a portable gaming device), and any other device.

Figure 2:
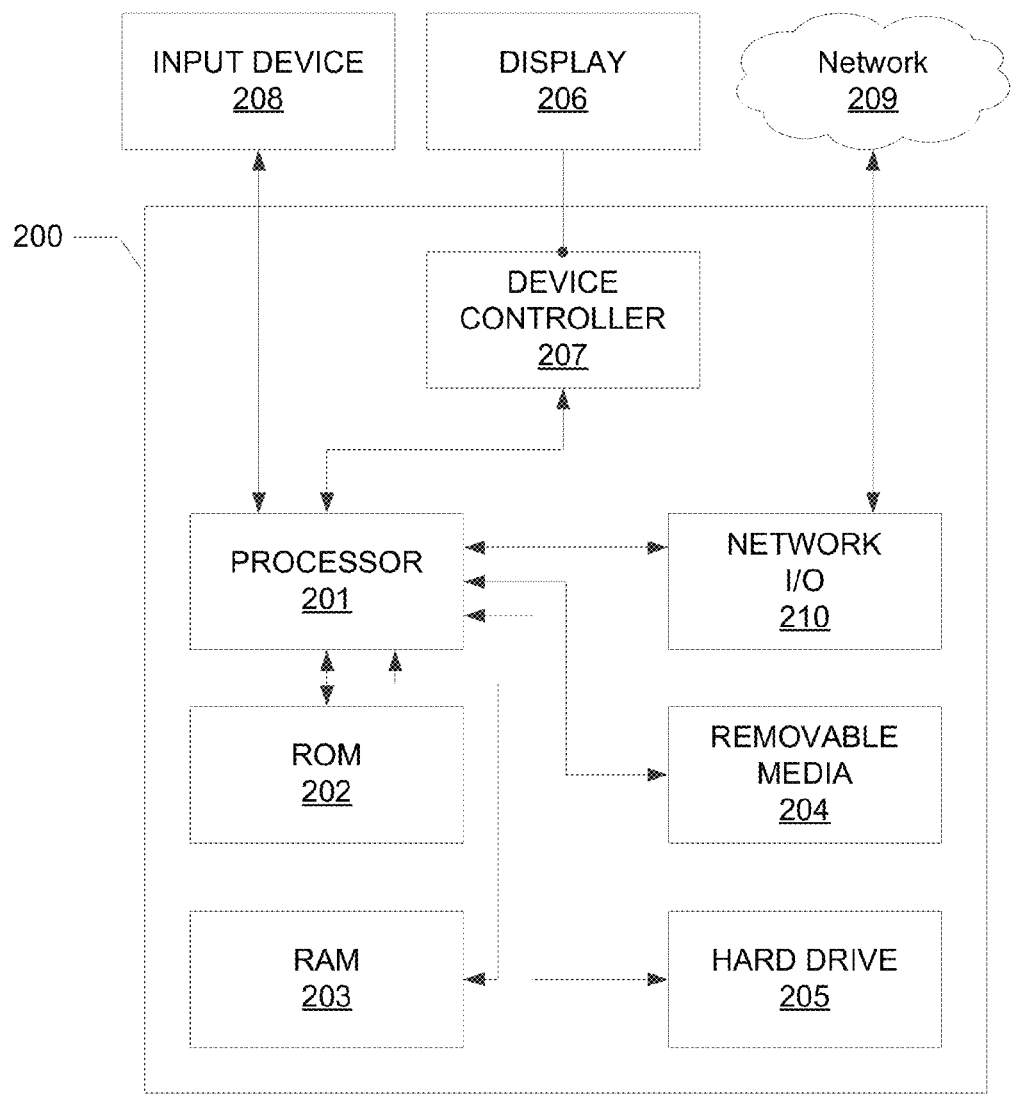
FIG. 2 illustrates an example computing and software platform on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Aspects of the disclosure implement a prediction algorithm for detecting a trend in the way a user is consuming a given portion of a content item on one of various types of devices 110-116 (e.g., user devices and/or client devices, such as a mobile device, personal computer, display device, etc.). A content item may represent any type or form of content; for instance, a content item may represent a video, web page list, audio content, mapping data, etc. being transmitted to a device 110-116. In general, aspects of the disclosure recognize that any content item may be transmitted in more than one content portion that may be displayed sequentially (e.g., as a liner progression) as a user is consuming the content item. For instance, a content portion may comprise the first two seconds of a movie; in this scenario, a device 110-116 associated with a user watching the first portion of the movie may receive and cache the second portion of the movie when the user consumes the first portion. If the user rewinds to a point near the beginning of the second content portion, device 110-116 may again retrieve and cache the first content portion.

Similarly, a content portion may comprise the first part of an electronic program guide (e.g., for channels 1-500 and/or for a given time frame). In this scenario, device 110-116 associated with a user scrolling up/down and/or left/right through the first portion of the electronic program guide may receive and cache electronic program guide data for additional channels and/or timeframes as a second content portion when the user scrolls to the end or near the end of the first portion. In yet other embodiments, a content portion may represent content that is off of one of the main axes; for instance, in the electronic program guide example above, a user may not be scrolling up/down (e.g., channel number) and/or left/right (e.g., time) through the guide but rather may be scrolling along a diagonal or some other direction. In this scenario, additional content portions may include channel/time information extrapolated off of the diagonal.

Aspects of the disclosure support content items that may be consumed on devices 110-116 along more than two axes. For instance, device 110-116 may support content portions along the z axis as well as content portions along the x and y axes, and all of these additional content portions may also be accessible to device 110-116 as described in this disclosure.

In caching a subsequent content portion, device 110-116 may overwrite the currently cached content portion because of limited storage space. Even though device 110-116 may transmit multiple requests for content portions that are a part of a given content item and may cache these content portions one at a time, the user experience may be seamless as the user consumes one or more content portions. In other words, because aspects of the disclosure allow for timing the caching of a new content portion based on the dynamics of the user consuming (e.g., navigating) a content portion, the user may not experience delays in waiting for a new content portion to be cached when consuming more than one content portion.

Local office 103 and/or device 110-116 may determine a consumption trend by calculating a rate (e.g., velocity) of consumption (e.g., change in a position/index per unit of time associated with a content portion), which may provide a speed and direction of consumption through a portion of a given content item. If local office 103 performs calculations related to a rate of consumption, device 110-116 may transmit consumption information to local office 103 so that local office 103 may use this information to perform the calculations. Once these calculations have been made, information related to the calculations may be transmitted from local office 103 to the device 110-116 to which these calculations pertain.

The rate of consumption may be calculated by determining a change in the position (e.g., a change in an index) within a given content portion divided by a duration over which the change takes place. For instance, to induce a positional change, a user may scroll up or down through a list of items within an electronic program guide. In another example, a user may rewind and/or fast forward from one index in a content portion to another (e.g., from one frame of a movie to another).

Local office 103 and/or device 110-116 may also calculate a value (e.g. an average rate, a weighted average rate, geometric mean of rates, median rate, sum of key presses on a user device, etc.) that is a function of one or more rate measurements (e.g., average rate of consumption=(rate measurement 1+rate measurement 2+ . . . +rate measurement N)/N). This value may change over time as a user changes his or her rate of consumption through a portion of a content item. Local office 103 and/or device 110-116 may also reset this value after a predetermined time period (e.g., after a user is idle within a content portion for a specified period of time). For instance, if a user consumes content at an average rate of 5 units (e.g., frames, etc.) per second and stays idle for the next 5 seconds, local office 103 and/or device 110-116 may recalculate the average rate of consumption (e.g., based on one or more new rate measurements over a predetermined time period).

Using the calculated value that is a function of one or more rate measurements, local office 103 and/or device 110-116 may calculate a projected position within a content portion in a given unit of time (e.g., 1 second, etc.) The projected position (e.g., projected index) may be defined as a current position (e.g., current index) within the content portion added to a product of the value that is a function of one or more rate measurements and an estimated time to retrieve an additional content portion. Device 110-116 and/or local office 103 may determine the estimated time to retrieve an additional content portion based on the average amount of network congestion and/or available network bandwidth.

If the projected position is past a specified threshold (e.g., end of the content portion, near the end of the content portion, etc.), then device 110-116 may retrieve and cache an additional content portion from local office 103. In accordance with aspects of the disclosure, these thresholds may be adjusted dynamically based various factors such as how quickly a user is consuming content, the detection of latency in the content delivery network, and/or the detection of predetermined key presses (e.g., "PAGE DOWN," "DOWN," etc.) made via user devices. For instance, if device 110-116 and/or local office 103 detects latency in the content delivery network, an additional content portion may be cached in device 110-116 sooner than would otherwise be the case. In addition, if device 110-116 detects more "PAGE DOWN" key presses than "DOWN" key presses on a user device (e.g., remote control), the threshold may be adjusted to a start or end of a subsequent page of content (e.g., webpage, list, etc.) rather than to the middle of a content page.

Local office 103 and/or device 110-116 may consider various types of user responses when calculating a projected position of user consuming a content portion. For instance, local office 103 and/or device 110-116 may consider whether or not a user is consuming a content portion quickly in a predetermined direction (e.g., by scrolling up, down, diagonally through a list at a rate above a predetermined threshold, fast forwarding and/or rewinding through other types of content portions at a rate above a predetermined threshold, etc.). If local office 103 and/or device 110-116 determines that a user is consuming a content portion quickly in a predetermined direction, the value that is a function of one or more rate measurements (e.g., an average rate, geometric mean rate, etc.) may be higher than expected and, therefore, device 110-116 may request that an additional content portion (e.g., one that makes sense based on the direction of consumption) be retrieved and locally cached more quickly than would otherwise be the case to avoid a situation where a user has to wait for additional content (e.g., via a loading screen) to be retrieved and cached.

Local office 103 and/or device 110-116 may also consider whether or not a user is consuming a content portion slowly in a predetermined direction (e.g., by scrolling up, down, diagonally through a list at a rate below a predetermined threshold, fast forwarding and/or rewinding through other types of content portions at a rate below a predetermined threshold, etc.). If local office 103 and/or device 110-116 determines that a user is consuming a content portion slowly in a predetermined direction, the value that is a function of one or more rate measurements may be lower than expected and, therefore, device 110-116 may request that an additional content portion (e.g., one that makes sense based on the direction of consumption) be retrieved and locally cached more slowly than would otherwise be the case to avoid a situation where device 110-116 prematurely caches additional content and thereby unnecessarily wastes network bandwidth.

Local office 103 and/or device 110-116 may also consider whether or not a user is consuming a content portion within a stagnant range (e.g., by scrolling up and down randomly through a list, fast forwarding and rewinding randomly through other types of content portions, etc.). In this scenario, because consumption rates are calculated based on both the magnitude and direction of the consumption, local office 103 and/or device 110-116 may calculate a value that is a function of one or more rate measurements that is lower than expected (e.g., as forward and backward rates cancel each other out, etc.) and, therefore, device 110-116 may request that an additional content portion (e.g., one that makes sense based on the direction of consumption) be locally cached more slowly than would otherwise be the case to avoid a situation where device 110-116 prematurely caches additional content and thereby unnecessarily wastes network bandwidth.

In some aspects, local office 103 and/or device 110-116 may determine that a user pressing a "PAGE DOWN"/"PAGE UP" key (and/or fast forward/rewind) on a user device (e.g., remote control, keyboard, etc.) while consuming a content item is consuming a content item quickly in one direction. Meanwhile, local office 103 and/or device 110-116 may determine that a user pressing a "DOWN"/"UP" key consistently and/or moving forward/backward by a small amount (e.g., by a single row or index in a list of items) while consuming a content item is consuming the content item slowly in one direction. In addition, local office 103 and/or device 110-116 may determine that a user pressing a combination of keys, the end result of which is to move forward/backward in one direction of a content item, is consuming the content item slowly in one direction. Finally, local office 103 and/or device 110-116 may determine that a user pressing a combination of keys but not moving in any given direction within a content item may be consuming the content item stagnantly within a range of the content item.

Figure 3:
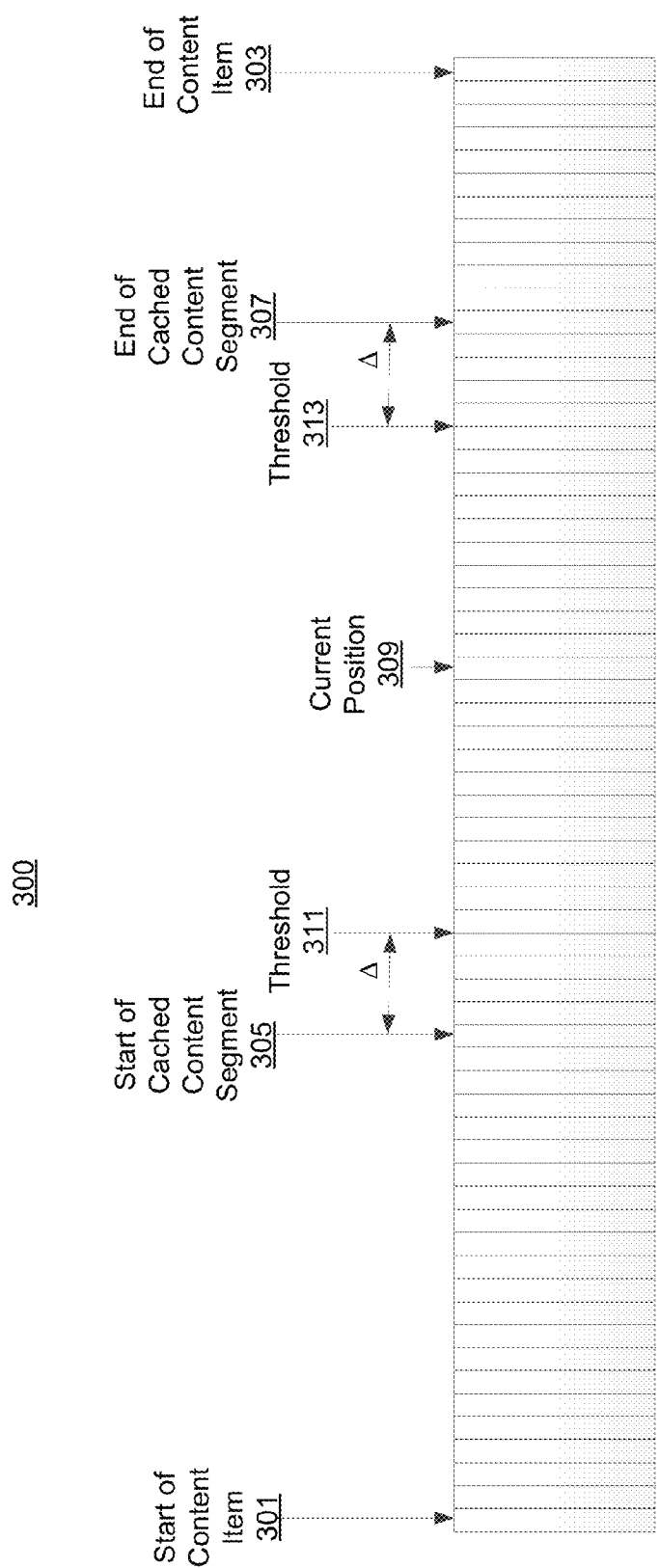
FIG. 3 illustrates the use of dynamic thresholds for retrieving content in accordance with example embodiments.

FIG. 3 illustrates the use of dynamic thresholds for retrieving additional content segments, portions of content, or any data, in accordance with example embodiments. The additional data may be associated with or supplemental to the previously received content or data. FIG. 3 depicts content item 300 (e.g., audio, video, and/or data) with start 301 and end 303. For example, content item 300 may represent a video and/or an electronic program guide being viewed by a user of a device 110-116. Each rectangle within content item 300 may represent a different position or index (e.g., to distinguish one entry of an electronic program guide from another, one frame of a movie from another, one segment or portion of content from another, etc.).

Device 110-116 may cache or otherwise store a segment (e.g., portion) of content item 300, such as, for example, from position (e.g., index) 305 to position 307. Device 110-116 may cache a portion of content item 300 based on which part of content item 300 a user is currently consuming. For instance, if a user is browsing an electronic program guide at channel 400, device 110-116 may have cached program guide information related to channels 300-500.

Based on how quickly the user is consuming (e.g., by scrolling up/down, fast forwarding, rewinding, etc.) content item 300 from a current position (e.g., current position 309), device 110-116 and/or local office 103 (e.g., a monitoring computing device) may determine a dynamic threshold (e.g., thresholds 311 and 313) for obtaining and caching an additional portion of content item 300. For instance, if a user is consuming content item 300 from current position 309 to end 307, device 110-116 and/or local office 103 may calculate a threshold 313 at which device 110-116 may request and cache an additional content portion associated with content item 300 (e.g., a content portion of predetermined length to the right of the content portion that starts at position 305 and ends at position 307).

Based on how quickly a user or associated device is consuming or navigating from current position 309 to either position 305 and/or position 307, and based on other factors such as network latency and/or predetermined signals (e.g., key presses) received through user devices communicating with device 110-116, device 110-116 and/or local office 103 may adjust the threshold 311 and/or 313 to either speed up or delay when an additional content portion of content item 300 is requested. For instance, if a user is quickly consuming content item 300 from current position 309 to position 305, threshold 311 may be re-calculated to occur at a position to the right of what is shown in FIG. 3. Alternatively, if a user is consuming content item 300 from current position 309 to position 305 slower than expected, threshold 311 may be re-calculated to occur at a position to the left of what is shown in FIG. 3. In this way, device 110-116 may not make premature and/or overdue requests for additional content portions to a content supplier (e.g., local office 103).

Figure 4:
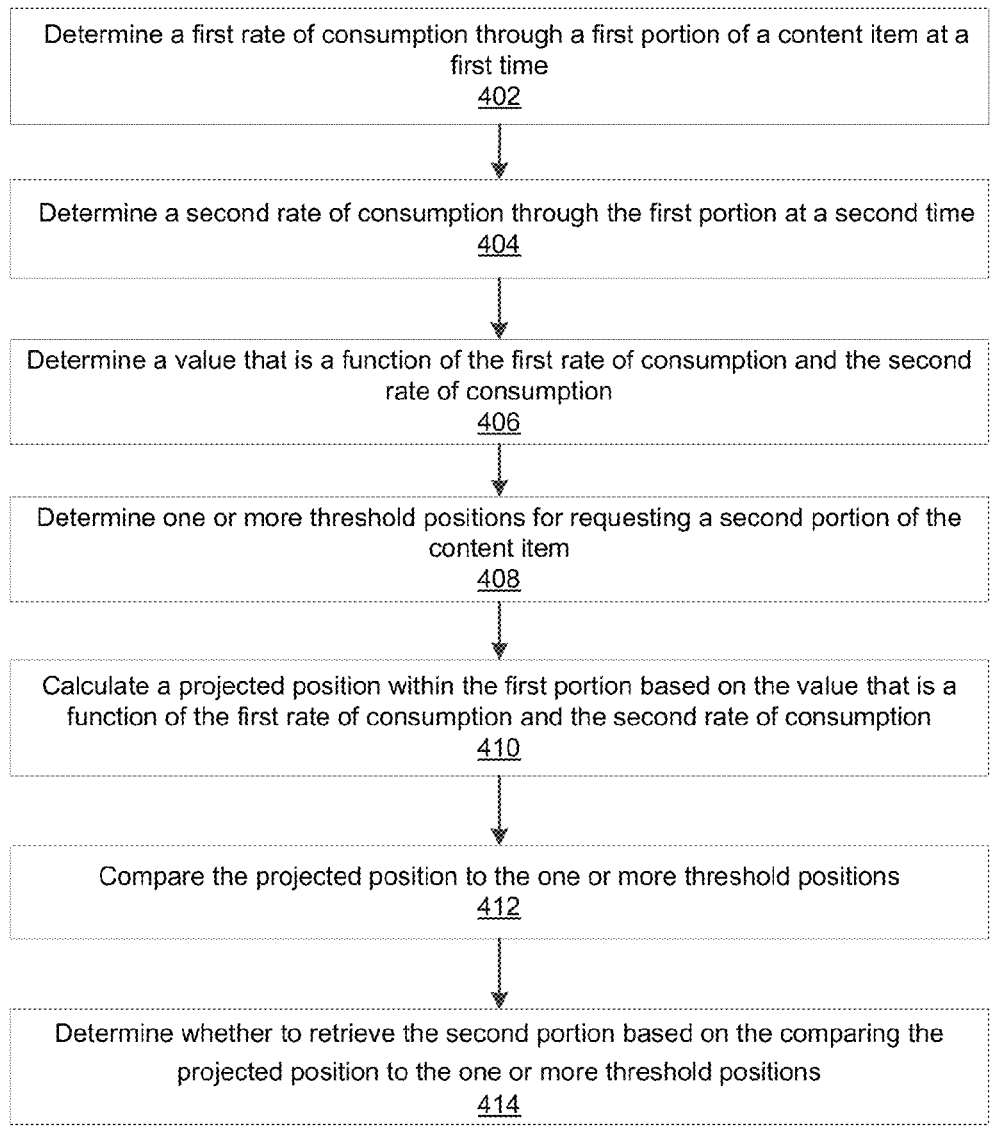
FIG. 4 illustrates a flow diagram of an example method for predictive content caching in accordance with example embodiments.

FIG. 4 illustrates a flow diagram of an example method for predictive content caching in accordance with example embodiments. Each of the steps shown in FIG. 4 may be performed by local office 103 (e.g., a computing device of the content source or provider), device 110-116, or another device. Also, the order of the steps shown in FIG. 4 may be rearranged, additional steps may be included, some steps may be removed, and some steps may be repeated one or more times. The method may begin at block 402 where a first rate (e.g., velocity) of consumption (e.g., navigation) through a first portion (e.g., segment) of a content item at a first time may be determined. This rate may be computed by determining a change in the position (e.g., a change in an index) within the first portion divided by a duration over which the change takes place.

The method may then move to block 404 where a second rate of consumption through the first portion at a second time may be determined. If local office 103 calculates the rate of consumption, device 110-116 may transmit consumption information to local office 103 so that local office 103 may use this information to perform the calculation.

The method may then move to block 406 to determine a value that is a function of the first rate of consumption and the second rate of consumption. In some aspects, this value may be a weighted average rate of consumption. The method may then move to block 408 to determine one or more threshold positions for requesting a second portion (e.g., fragment or segment) of the content item. Thresholds may be calculated based on the magnitude and direction of the value (e.g., a rate vector) calculated in block 406 and the time that device 110-116 would take to retrieve the second portion (which is based on various factors, including network congestion and bandwidth availability). Thresholds may also be dynamically updated as the value calculated in block 406 changes in real-time. The direction of the value calculated in block 406 may also determine which of several second content portions may be retrieved by device 110-116. For instance, if the value calculated in block 406 points in the forward direction, a second content portion positioned logically to the right of the current content portion may be retrieved by device 110-116. Alternatively, if the value calculated in block 406 points in a diagonal direction (e.g., within a program guide listing), a second content portion extrapolated off of the diagonal may be retrieved by device 110-116.

Next, in block 410, a projected position (e.g., an index value) within the first portion may be determined based on the value calculated in block 406. The projected position may be calculated as a current position (e.g., current index) within the first content portion added to a product of the value calculated in block 406 and an estimated time to retrieve a second content portion.

The method may then move to block 412 where the projected position calculated in block 410 may be compared to the one or more threshold positions determined in step 408. Then, in step 414, the method may determine whether to retrieve the second portion based on the comparing the projected position to the one or more threshold positions.

The method may then end, may repeat one or more times, or may return to any of the preceding blocks. The various features described above are merely non-limiting examples, and can be rearranged, combined, subdivided, omitted, and/or altered in any desired manner. For example, features of the servers can be subdivided among multiple processors and computing devices.

Any of the above-mentioned functional components may be implemented with at least one processor and at least one memory. The functional components may include hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the components of FIG. 1 and FIG. 2 as described herein may be implemented, for example, by reading and executing such computer-readable instructions for performing those functions, and/or by any hardware subsystem (e.g., a processor) from which the computer is composed.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A method comprising:
   determining, by a computing device, a first rate of consumption of a first portion of a content item at a first time, wherein the first rate of consumption corresponds to a first change in a first current consumption position in the first portion of the content item over a first time duration;
   determining, by the computing device, a second rate of consumption of the first portion at a second time, wherein the second rate of consumption corresponds to a second change in a second current consumption position in the first portion of the content item over a second time duration;
   determining, by the computing device, a value that is a function of the first rate of consumption and the second rate of consumption;
   determining, by the computing device, a direction of consumption that is based on the first rate of consumption and the second rate of consumption;
   determining, by the computing device, one or more threshold positions for requesting a second portion of the content item, wherein at least one of the one or more threshold positions is determined based on the value, the direction of consumption, and an estimated time for retrieval of the second portion of the content item; and
   in response to determining that a third current consumption position has reached a threshold position of the one or more threshold positions, retrieving, by the computing device and from a content delivery network, the second portion of the content item.

2. The method of claim 1, further comprising: caching, by the computing device, the second portion after the retrieving.

3. The method of claim 1, further comprising: receiving, by the computing device, an input from a user, wherein the input is used in determining the first rate of consumption and the second rate of consumption.

4. The method of claim 1, further comprising:
   determining, by the computing device, a level of network congestion associated with retrieving the second portion, wherein the determining the one or more threshold positions for requesting the second portion further comprises determining the one or more threshold positions based, at least in part, on the level of network congestion.

5. The method of claim 1, further comprising:
   determining, by the computing device, a third rate of consumption of the first portion of a content item at a third time, wherein the third rate of consumption corresponds to a third change in a fourth current consumption position in the first portion of the content item over the first time duration;
   determining, by the computing device, a fourth rate of consumption of the first portion at a fourth time, wherein the fourth rate of consumption corresponds to a fourth change in a fifth current consumption position in the first portion of the content item over the second time duration;
   determining, by the computing device, a second value that is a function of the third rate of consumption and the fourth rate of consumption;
   comparing, by the computing device, the value and the second value; and
   changing, by the computing device, one or more of the threshold positions for requesting the second portion of the content item based on the comparing of the value and second value.

6. The method of claim 1, further comprising:
   determining, by the computing device, that the value is zero; and determining, by the computing device and based on the determining that the value is zero, a new first rate of consumption and a new second rate of consumption, wherein:
   the new first rate of consumption corresponds to a third change in the first current consumption position in the first portion of the content item over a third time duration, and
   the new second rate of consumption corresponds to a fourth change in the second current consumption position in the first portion of the content item over a fourth time duration;
determining, by the computing device, a new value that is a function of the new first rate of consumption and new second rate of consumption; and
changing, by the computing device, one or more of the threshold positions for requesting the second portion of the content item based on the new value.

7. An apparatus comprising:
one or more processors; and
memory storing instructions that, when executed by the one or more processors, cause the apparatus to:
   determine a first rate of consumption of a first portion of a content item at a first time, wherein the first rate of consumption corresponds to a first change in a first current consumption position in the first portion of the content item over a first time duration;
   determine a second rate of consumption of the first portion at a second time, wherein the second rate of consumption corresponds to a second change in a second current consumption position in the first portion of the content item over a second time duration;
   determine a value that is a function of the first rate of consumption and the second rate of consumption;
   determine a direction of consumption that is based on the first rate of consumption and the second rate of consumption;
   determine one or more threshold positions for requesting a second portion of the content item, wherein at least one of the one or more threshold positions is determined based on the value, the direction of consumption, and an estimated time for retrieval of the second portion of the content item; and
   in response to determining that a third current consumption position has reached a threshold position of the one or more threshold positions, retrieve, from a content delivery network, the second portion of the content item.

8. The apparatus of claim 7, wherein the instructions, when executed by the one or more processors, further cause the apparatus to:
   cache the second portion after the retrieving.

9. The apparatus of claim 7, wherein the instructions, when executed by the one or more processors, further cause the apparatus to:
   retrieve an input from a user, wherein the input is used in determining the first rate of consumption and the second rate of consumption.

10. The apparatus of claim 7, wherein the instructions, when executed by the one or more processors, further cause the apparatus to:
   determine a level of network congestion associated with retrieving the second portion, wherein the determining the one or more threshold positions for requesting the second portion further comprises determining the one or more threshold positions based, at least in part, on the level of network congestion.

11. The apparatus of claim 7, wherein the instructions, when executed by the one or more processors, further cause the apparatus to:
   determine a third rate of consumption of the first portion of a content item at a third time, wherein the third rate of consumption corresponds to a third change in a fourth current consumption position in the first portion of the content item over the first time duration;
   determine a fourth rate of consumption of the first portion at a fourth time, wherein the fourth rate of consumption corresponds to a fourth change in a fifth current consumption position in the first portion of the content item over the second time duration;
   determine a second value that is a function of the third rate of consumption and the fourth rate of consumption;
   compare the value and the second value; and
   change one or more of the threshold positions for requesting the second portion of the content item based on the comparing of the value and second value.

12. The apparatus of claim 7, wherein the instructions, when executed by the one or more processors, further cause the apparatus to:
   determine that the value is zero; and
   determine, based on the determining that the value is zero, a new first rate of consumption and a new second rate of consumption, wherein:
      the new first rate of consumption corresponds to a third change in the first current consumption position in the first portion of the content item over a third time duration, and
      the new second rate of consumption corresponds to a fourth change in the second current consumption position in the first portion of the content item over a fourth time duration;
   determine a new value that is a function of the new first rate of consumption and new second rate of consumption; and
   change one or more of the threshold positions for requesting the second portion of the content item based on the new value.

13. A system comprising:
a content delivery network; and
a computing device comprising one or more processors and memory storing instructions that, when executed by the one or more processors, cause the computing device to:
   determine a first rate of consumption of a first portion of a content item at a first time, wherein the first rate of consumption corresponds to a first change in a first current consumption position in the first portion of the content item over a first time duration;
   determine a second rate of consumption of the first portion at a second time, wherein the second rate of consumption corresponds to a second change in a second current consumption position in the first portion of the content item over a second time duration;
   determine a value that is a function of the first rate of consumption and the second rate of consumption;
   determine a direction of consumption that is based on the first rate of consumption and the second rate of consumption;
   determine one or more threshold positions for requesting a second portion of the content item, wherein at least one of the one or more threshold positions is determined based on the value, the direction of consumption, and an estimated time for retrieval of the second portion of the content item; and in response to determining that a third current consumption position has reached a threshold position of the one or more threshold positions, retrieve, from the content delivery network, the second portion of the content item.

14. The system of claim 13, wherein the computing device is further configured to:
cache the second portion after the retrieving.

15. The system of claim 13, wherein the computing device is further configured to:
retrieve an input from a user, wherein the input is used in determining the first rate of consumption and the second rate of consumption.

16. The system of claim 13, wherein the computing device is further configured to:
determine a level of network congestion associated with retrieving the second portion, wherein the determining the one or more threshold positions for requesting the second portion further comprises determining the one or more threshold positions based, at least in part, on the level of network congestion.

17. The system of claim 13, wherein the computing device is further configured to:
determine a third rate of consumption of the first portion of a content item at a third time, wherein the third rate of consumption corresponds to a third change in a fourth current consumption position in the first portion of the content item over the first time duration;

determine a fourth rate of consumption of the first portion at a fourth time, wherein the fourth rate of consumption corresponds to a fourth change in a fifth current consumption position in the first portion of the content item over the second time duration;

determine a second value that is a function of the third rate of consumption and the fourth rate of consumption;

compare the value and the second value; and change one or more of the threshold positions for requesting the second portion of the content item based on the comparing of the value and second value.

18. The system of claim 13, wherein the computing device is further configured to:
determine that the value is zero; and
determine, based on the determining that the value is zero, a new first rate of consumption and a new second rate of consumption, wherein:
the new first rate of consumption corresponds to a third change in the first current consumption position in the first portion of the content item over a third time duration, and
the new second rate of consumption corresponds to a fourth change in the second current consumption position in the first portion of the content item over a fourth time duration;
determine a new value that is a function of the new first rate of consumption and new second rate of consumption; and
change one or more of the threshold positions for requesting the second portion of the content item based on the new value.

* * * * *